US005903225A

United States Patent [19]

Schmitt et al.

[11] Patent Number: 5,903,225

[45] Date of Patent: May 11, 1999

[54] ACCESS CONTROL SYSTEM INCLUDING FINGERPRINT SENSOR ENROLLMENT AND ASSOCIATED METHODS

[75] Inventors: John C. Schmitt, Indialantic; Dale R. Setlak, Melbourne, both of Fla.

[73] Assignee: Harris Corporation, Palm Bay, Fla.

[21] Appl. No.: 08/857,523

[22] Filed: May 16, 1997

[51] Int. Cl.[6] .......... H04Q 1/00

[52] U.S. Cl. .......... 340/825.31; 340/825.34; 235/380; 235/382.5; 380/23

[58] Field of Search .......... 340/825.31, 825.3, 340/825.34, 825.54, 825.69, 825.72; 235/380, 382.5; 70/276–8; 380/23

[56] References Cited

U.S. PATENT DOCUMENTS

| | | | |
|---|---|---|---|
| 4,202,120 | 5/1980 | Engel | 40/2.2 |
| 4,210,899 | 7/1980 | Swonger et al. | 340/146.3 |
| 4,353,056 | 10/1982 | Tsikos | 340/146.3 E |
| 4,509,093 | 4/1985 | Stellberger | 361/172 |
| 4,557,504 | 12/1985 | Kuhns | 283/68 |
| 4,768,021 | 8/1988 | Ferraro | 340/568 |
| 4,811,414 | 3/1989 | Fishbine et al. | 382/52 |
| 4,983,846 | 1/1991 | Rios et al. | 250/458.1 |
| 4,993,068 | 2/1991 | Piosenka et al. | 380/23 |
| 5,222,152 | 6/1993 | Fishbine et al. | 382/2 |
| 5,224,173 | 6/1993 | Kuhns et al. | 382/2 |
| 5,245,329 | 9/1993 | Gokcebay | 340/825.31 |
| 5,280,527 | 1/1994 | Gullman et al. | 380/23 |
| 5,325,442 | 6/1994 | Knapp | 382/4 |
| 5,363,453 | 11/1994 | Gagne et al. | 382/5 |
| 5,386,104 | 1/1995 | Sime | 235/379 |
| 5,467,403 | 11/1995 | Fishbine et al. | 382/116 |
| 5,509,083 | 4/1996 | Abtahi et al. | 382/124 |
| 5,513,272 | 4/1996 | Bogosian, Jr. | 382/116 |
| 5,541,585 | 7/1996 | Duhame et al. | 340/825.69 |
| 5,541,994 | 7/1996 | Tomko et al. | 380/30 |
| 5,546,471 | 8/1996 | Merjanian | 382/124 |
| 5,559,504 | 9/1996 | Itsumi et al. | 340/825.3 |
| 5,598,474 | 1/1997 | Johnson | 380/23 |
| 5,603,179 | 2/1997 | Adams | 42/70.08 |
| 5,613,712 | 3/1997 | Jeffers | 283/78 |
| 5,623,552 | 4/1997 | Lane | 382/124 |

*Primary Examiner*—William A. Cuchlinski, Jr.
*Assistant Examiner*—Yonel Beaulieu
*Attorney, Agent, or Firm*—Allen, Dyer, Doppelt, Milbrath & Gilchrist, P.A.

[57] ABSTRACT

An access control system includes a fingerprint enrolling station for sensing a fingerprint of a person and enrolling the person as an authorized person based upon the sensed fingerprint. The system also includes an access triggering device to be carried by the authorized person, and an access controller for granting access to an authorized person bearing the access triggering device. The access triggering device preferably cooperates with the enrolling station to store authorization data for an authorized person based upon the sensed fingerprint. The access triggering device also preferably includes a wireless transmitter, such as a passive transponder, for transmitting an authorization signal related to the stored authorization data. In addition, the access controller preferably includes a wireless receiver, such as including a transponder powering circuit, for receiving the authorization signal and granting access responsive to the wireless transmitter being in proximity to the wireless receiver. The authorized person bearing the access trigger device may unobtrusively be granted access merely by approaching the access location.

24 Claims, 6 Drawing Sheets

ACCESS CONTROL SYSTEM INCLUDING FINGERPRINT SENSOR ENROLLMENT AND ASSOCIATED METHODS

FIELD OF THE INVENTION

The present invention relates to the field of personal identification and verification, and, more particularly, to the field of fingerprint sensing and processing.

BACKGROUND OF THE INVENTION

Fingerprint sensing and matching is a reliable and widely used technique for personal identification or verification. In particular, a common approach to fingerprint identification involves scanning a sample fingerprint or an image thereof and storing the image and/or unique characteristics of the fingerprint image. The characteristics of a sample fingerprint may be compared to information for reference fingerprints already in a database to determine proper identification of a person, such as for verification purposes.

A typical electronic fingerprint sensor is based upon illuminating the finger surface using visible light, infrared light, or ultrasonic radiation. The reflected energy is captured with some form of camera, for example, and the resulting image is framed, digitized and stored as a static digital image. U.S. Pat. No. 4,525,859 to Bowles similarly discloses a video camera for capturing a fingerprint image and uses the minutiae of the fingerprints, that is, the branches and endings of the fingerprint ridges, to determine a match with a database of reference fingerprints.

Unfortunately, optical sensing may be affected by stained fingers or an optical sensor may be deceived by presentation of a photograph or printed image of a fingerprint rather than a true live fingerprint. In addition, optical schemes may require relatively large spacings between the finger contact surface and associated imaging components. Moreover, such sensors typically require precise alignment and complex scanning of optical beams. Accordingly, optical sensors may thus be bulky and be susceptible to shock, vibration and surface contamination. Accordingly, an optical fingerprint sensor may be unreliable in service in addition to being bulky and relatively expensive due to optics and moving parts.

U.S. Pat. No. 4,353,056 to Tsikos discloses another approach to sensing a live fingerprint. In particular, the patent discloses an array of extremely small capacitors located in a plane parallel to the sensing surface of the device. When a finger touches the sensing surface and deforms the surface, a voltage distribution in a series connection of the capacitors may change. The voltages on each of the capacitors is determined by multiplexor techniques. Unfortunately, the resilient materials required for the sensor may suffer from long term reliability problems. In addition, multiplexing techniques for driving and scanning each of the individual capacitors may be relatively slow and cumbersome. Moreover, noise and stray capacitances may adversely affect the plurality of relatively small and closely spaced capacitors.

As mentioned briefly above, fingerprint sensing may have many applications. For example, U.S. Pat. No. 5,623,552 to Lane discloses a self-authenticating card including a live fingerprint sensor and which confirms the identity of the person upon matching of the sensed live fingerprint with a stored fingerprint. U.S. Pat. No. 4,993,068 to Piosenka et al. discloses a personal identification system also matching credentials stored on a portable memory devices, such as a card, to a physical characteristic, such as a live fingerprint. Matching may determine access to a remote site, for example.

U.S. Pat. No. 5,467,403 to Fishbine et al. discloses a portable optical fingerprint scanner which can record fingerprint images in the field and transmit the images to a mobile unit for processing and subsequent wireless transmission to a central location, for providing immediate identity and background checks on the individuals being fingerprinted. The image may previewed on a screen carried by the housing of the portable scanner.

Also relating to access control, U.S. Pat. No. 4,210,899 to Swonger et al. discloses an optical fingerprint sensor connected in communication with a central control computer for granting access to particular persons and according to particular schedules. Particular access control applications are listed as for: computer centers, radioactive or biological danger areas, controlled experiments, information storage areas, airport maintenance and freight areas, hospital closed areas and drug storage areas, apartment houses and office buildings after hours, safe deposit boxes and vaults, and computer terminal entry and access to information.

U.S. Pat. No. 5,245,329 to Gokcebay discloses an access control system, such as for the doors of secured areas, wherein a mechanical key includes encoded data stored thereon, such as fingerprint information. A fingerprint sensor is positioned at the access point and access is granted if the live fingerprint matches the encoded fingerprint data from the key.

Unfortunately, conventional access control systems based on fingerprint technology use an optical sensor with its attendant drawbacks and disadvantages. In addition, a user typically must be inconvenienced to swipe a card through a reader. A conventional access control system based on fingerprint technology also typically requires that the user experience the further inconvenience of stopping for an additional fingerprint sensing before access is granted.

SUMMARY OF THE INVENTION

In view of the foregoing background, it is therefore an object of the present invention to provide an access control system and associated methods for reliably controlling access in a secure and unobtrusive manner.

This and other objects, features and advantages in accordance with the present invention are provided by an access control system comprising: fingerprint enrolling means for sensing a fingerprint of a person and enrolling the person as an authorized person; an access triggering device to be carried by the authorized person; and access control means for granting access to an authorized person bearing the access triggering device based upon the person approaching the access location.

The access triggering device preferably comprises data storing means, cooperating with the enrolling means, for storing authorization data for an authorized person. The access triggering device also preferably includes wireless transmitter means for transmitting an authorization signal related to the stored authorization data. In addition, the access control means preferably includes wireless receiver means for receiving the authorization signal and granting access responsive to the wireless transmitter means being in proximity to the wireless receiver means.

The authorized person bearing the access trigger device may unobtrusively be granted access merely by approaching the access location. The access triggering device will communicate with the access control means and grant access as long as the device bearer is sufficiently close to the access location. In other words, the authorized person need not go through the inconvenience of locating and manipulating a card for swiping through a card reader, for example. In addition, the person preferably need not stop for another fingerprinting step at the access location. Moreover, a high degree of security is provided since the person is originally enrolled based upon the positive identification afforded by fingerprint sensing.

In one particularly, advantageous embodiment, the wireless transmitter means comprises a passive transponder. Thus, the wireless receiver means preferably comprises transponder powering means for powering the passive transponder when positioned in proximity thereto. The transponder and powering circuit therefore may be configured so that powering and authorizing signal transmission occurs only as the authorized person is within a predetermined distance of the access control means at the access location. The data storing means and passive transponder may be readily miniaturized to fit on or within a card to be carried in a pocket or wallet, or carried as a badge, for example.

Another aspect of the invention is the provision of record generating means at the access control means for causing generation of a record of granting access to the authorized person. The data storing means of the access triggering device may also include identity storing means for storing authorization data relating to the identity of the authorized person. Accordingly, a record of the person's identity may be made along with the record of granting access.

The access control system may include an access door. The access control means will then further comprise door control means for controlling the access door, such as for controlling locking or automatic opening of the door.

The fingerprint sensor of the enrollment means is preferably reliable, rugged, low cost and compact. Accordingly, another aspect of the invention is that the fingerprint sensor is preferably an integrated circuit fingerprint sensor. The integrated circuit fingerprint sensor preferably comprises a substrate, and at least one electrically conductive layer positioned adjacent the substrate and comprising portions defining an array of electric field sensing electrodes. The at least one electrically conductive layer may further include portions defining a respective shield electrode for each electric field sensing electrode.

A method aspect of the present invention is for access control at an access location. The method preferably comprises the steps of: sensing a fingerprint of a person and enrolling the person as an authorized person based upon the sensed fingerprint; storing authorization data for an authorized person in an access triggering device to be carried by the authorized person; transmitting an authorization signal related to the stored authorization data; and receiving the authorization signal and granting access to an authorized person bearing the access triggering device based upon the access triggering device being in proximity to the access location. As mentioned above, the access triggering device may comprise a passive transponder. Accordingly, the method may preferably further comprise the step of powering the passive transponder when positioned within a predetermined distance of the access location.

DETAILED DESCRIPTION OF THE PREFERRED EMBODIMENTS

Figure 1:
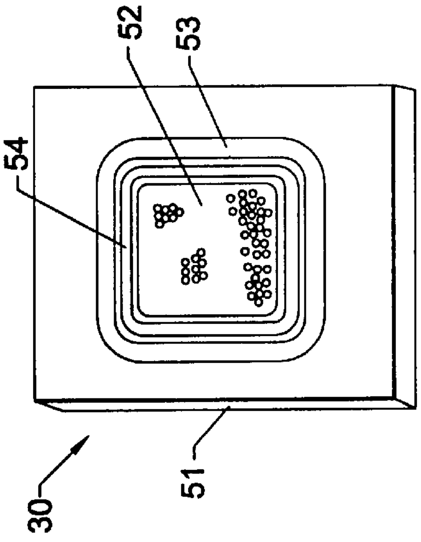
FIG. 1 is a top plan view of a fingerprint sensor in accordance with the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout. The scaling of various features, particularly layers in the drawing figures, have been exaggerated for clarity of explanation.

Figure 2:
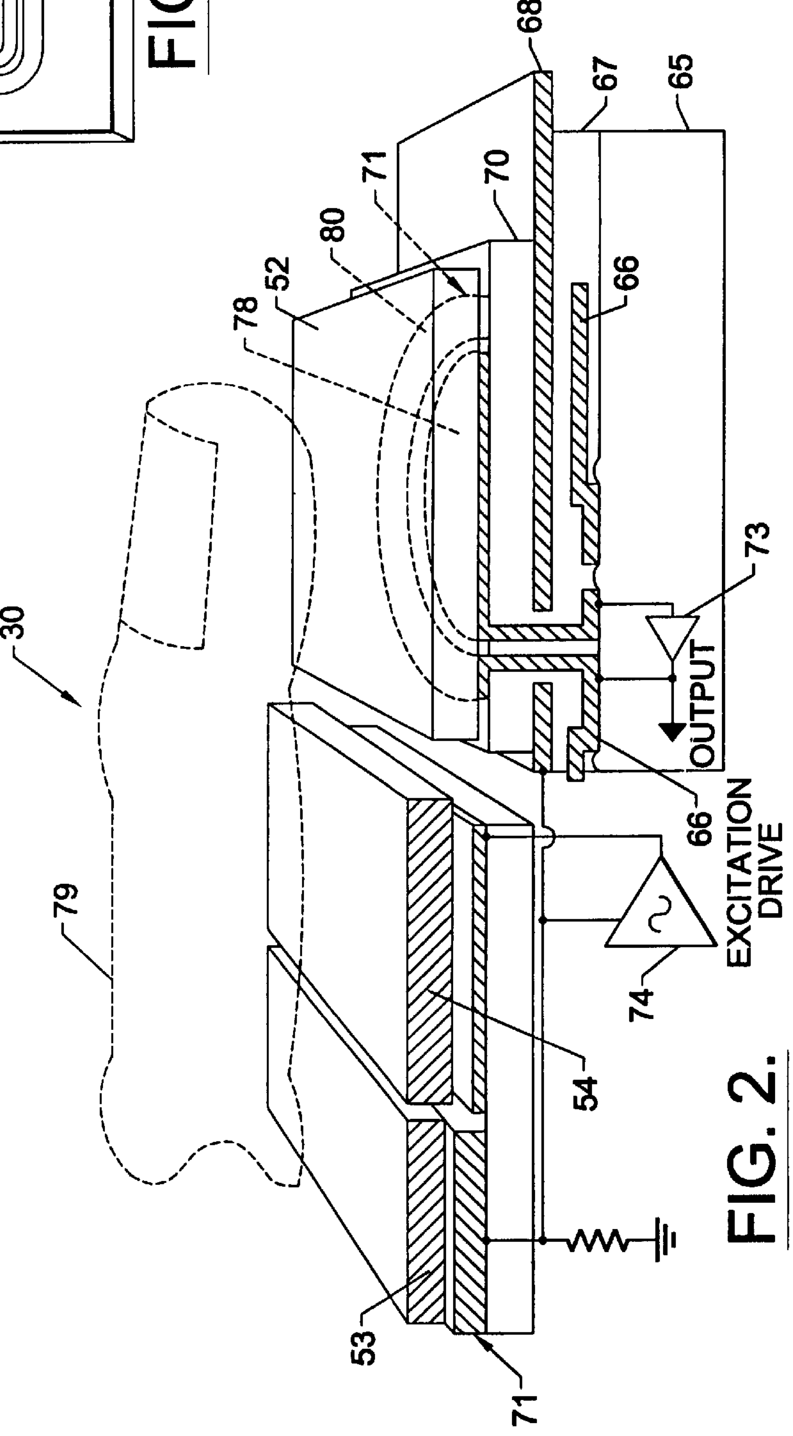
FIG. 2 is a schematic view of a circuit portion of the fingerprint sensor as shown in FIG. 1.
Figure 3:
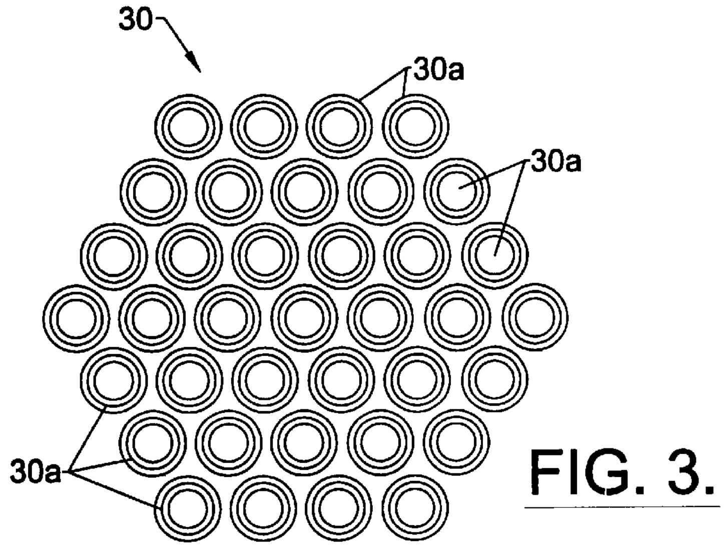
FIG. 3 is a greatly enlarged top plan view of the sensing portion of the fingerprint sensor as shown in FIG. 1.

Referring to FIGS. 1–3, the fingerprint sensor 30 in accordance with the invention is initially described. The illustrated sensor 30 includes a housing or package 51, a dielectric layer 52 exposed on an upper surface of the package which provides a placement surface for the finger, and a plurality of output pins, not shown. A first conductive strip or external electrode 54 around the periphery of the dielectric layer 52, and a second external electrode 53 provide contact electrodes for the finger 79 as described in greater detail below. The sensor 30 may provide output signals in a range of sophistication levels depending on the level of processing incorporated in the package as would be readily understood by those skilled in the art.

The sensor 30 includes a plurality of individual pixels or sensing elements 30*a* arranged in array pattern as perhaps best shown in FIG. 3. As would be readily understood by those skilled in the art, these sensing elements are relatively small so as to be capable of sensing the ridges 59 and intervening valleys 60 of a typical fingerprint. As will also be readily appreciated by those skilled in the art, live fingerprint readings as from the electric field sensor 30 in accordance with the present invention may be more reliable than optical sensing, because the impedance of the skin of a finger in a pattern of ridges and valleys is extremely difficult to simulate. In contrast, an optical sensor may be deceived by a readily deceived by a photograph or other similar image of a fingerprint, for example.

The sensor 30 includes a substrate 65, and one or more active semiconductor devices formed thereon, such as the schematically illustrated amplifier 73. A first metal layer 66 interconnects the active semiconductor devices. A second or ground plane electrode layer 68 is above the first metal layer 66 and separated therefrom by an insulating layer 67. A third metal layer 71 is positioned over another dielectric layer 70. In the illustrated embodiment, the first external electrode 54 is connected to an excitation drive amplifier 74 which, in turn, drives the finger 79 with a signal may be typically in the range of about 1 KHz to 1 MHz. Accordingly, the drive or excitation electronics are thus relatively uncomplicated and the overall cost of the sensor 30 may be relatively low, while the reliability is great.

An illustratively circularly shaped electric field sensing electrode 73 is on the insulating layer 70. The sensing electrode 78 may be connected to sensing integrated electronics, such as the illustrated amplifier 73 formed adjacent the substrate 65 as schematically illustrated, and as would be readily appreciated by those skilled in the art.

An annularly shaped shield electrode 80 surrounds the sensing electrode 78 in spaced relation therefrom. As would be readily appreciated by those skilled in the art, the sensing electrode 78 and its surrounding shield electrode 80 may have other shapes, such as hexagonal, for example, to facilitate a close packed arrangement or array of pixels or sensing elements 30*a*. The shield electrode 80 is an active shield which is driven by a portion of the output of the amplifier 73 to help focus the electric field energy and, moreover, to thereby reduce the need to drive adjacent electric field sensing electrodes 78.

The sensor 30 includes only three metal or electrically conductive layers 66, 68 and 71. The sensor 30 can be made without requiring additional metal layers which would otherwise increase the manufacturing cost, and, perhaps, reduce yields. Accordingly, the sensor 30 is less expensive and may be more rugged and reliable than a sensor including four or more metal layers as would be appreciated by those skilled in the art.

Another important aspect of the present invention is that the amplifier 73 may be operated at a gain of greater than about one to drive the shield electrode 80. Stability problems do not adversely affect the operation of the amplifier 73. Moreover, the common mode and general noise rejection are greatly enhanced according to this feature of the invention. In addition, the gain greater than one tends to focus the electric field with resect to the sensing electrode 78 as will be readily appreciated by those skilled in the art.

In general, the sensing elements 30*a* operate at very low currents and at very high impedances. For example, the output signal from each sensing electrode 78 is desirably about 5 to 10 millivolts to reduce the effects of noise and permit further processing of the signals. The approximate diameter of each sensing element 30*a*, as defined by the outer dimensions of the shield electrode 80, may be about 0.002 to 0.005 inches in diameter. The ground plane electrode 68 protects the active electronic devices from unwanted excitation. The various signal feedthrough conductors for the electrodes 78, 80 to the active electronic circuitry may be readily formed as would be understood by those skilled in the art.

The overall contact or sensing surface for the sensor 30 may desirably be about 0.5 by 0.5 inches—a size which may be readily manufactured and still provide a sufficiently large surface for accurate fingerprint sensing and identification. The sensor 30 in accordance with the invention is also fairly tolerant of dead pixels or sensing elements 30*a*. A typical sensor 30 includes an array of about 256 by 256 pixels or sensor elements, although other array sizes are also contemplated by the present invention. The sensor 30 may also be fabricated at one time using primarily conventional semiconductor manufacturing techniques to thereby significantly reduce the manufacturing costs.

Figure 4:
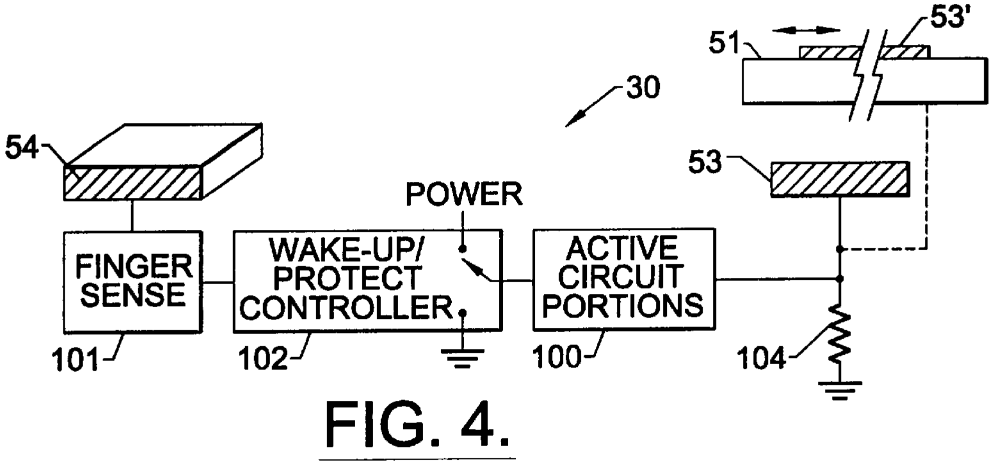
FIG. 4 is a schematic diagram of another circuit portion of the fingerprint sensor as shown in FIG. 1.

Turning now additionally to FIG. 4, another aspect of the sensor 30 of the invention is described. The sensor may include power control means for controlling operation of active circuit portions 100 based upon sensing finger contact with the first external electrode 54 as determined by the illustrated finger sense block or circuit 101. For example, the finger sense circuit 101 may operate based upon a change in impedance to an oscillator to thereby determine finger contact. Of course, other approaches for sensing contact with the finger are also contemplated by the invention. The power control means may include wake-up means for only powering active circuit portions upon sensing finger contact with the first external electrode to thereby conserve power. Alternately or additionally, the power control means may further comprise protection means for grounding active circuit portions upon not sensing finger contact with the first external electrode. In the illustrated embodiment, a combination of wake-up and protection controller circuits 101 are illustrated.

Moreover, the fingerprint sensor 30 may further comprise finger charge bleed means for bleeding a charge from a finger or other object upon contact therewith. The finger charge bleed means may be provided by the second external electrode 53 carried by the package 51 for contact by a finger, and a charge bleed resistor 104 connected between the second external electrode and an earth ground. As schematically illustrated in the upper right hand portion of FIG. 4, the second electrode may alternately be provided by a movable electrically conductive cover 53' slidably connected to the package 51 for covering the opening to the exposed upper dielectric layer 52. A pivotally connected cover is also contemplated by the present invention. Accordingly, under normal conditions, the charge would be bled from the finger as the cover 53' is moved to expose the sensing portion of the sensor 30.

In addition, the finger charge bleed means and power control means may be such that the active portions remain grounded until the charge bleed means can remove the charge on the finger before powering the active circuit portions, such as by providing a brief delay during wake-up sufficient to permit the charge to be discharged through the resistor 104 as would be readily understood by those skilled in the art. Accordingly, power may be conserved in the sensor 30 and ESD protection provided by the sensor so that the sensor is relatively inexpensive, yet robust and conserves power.

Figure 5:
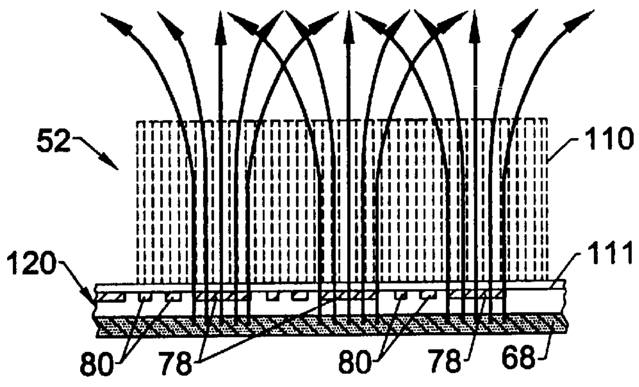
FIG. 5 is a greatly enlarged side cross-sectional view of a portion of the fingerprint sensor as shown in FIG. 1.

Referring now additionally to FIG. 5 yet another significant feature of the sensor 30 is described. The dielectric covering 52 may preferably comprise a z-axis anisotropic dielectric layer 110 for focussing an electric field, shown by the illustrated field lines, at each of the electric field sensing electrodes 78. In other words, the dielectric layer 110 may be relatively thick, but not result in defocussing of the electric fields propagating therethrough because of the z-axis anisotropy of the material. Typically there would be a trade-off between field focus and mechanical protection. Unfortunately, a thin film which is desirable for focussing, may permit the underlying circuit to be more easily subject to damage.

The z-axis anisotropic dielectric layer 110 of the present invention, for example, may have a thickness in range of about 0.0001 to 0.004 inches. Of course, the z-axis anisotropic dielectric layer 110 is also preferably chemically resistant and mechanically strong to withstand contact with fingers, and to permit periodic cleanings with solvents. The z-axis anisotropic dielectric layer 110 may preferably define an outermost protective surface for the integrated circuit die 120. Accordingly, the overall dielectric covering 52 may further include at least one relatively thin oxide, nitride, carbide, or diamond layer 111 on the integrated circuit die 120 and beneath the z-axis anisotropic dielectric layer 110. The thin layer 111 will typically be relatively hard, and the z-axis anisotropic dielectric layer 110 is desirably softer to thereby absorb more mechanical activity.

The z-axis anisotropic dielectric layer 110 may be provided by a plurality of oriented dielectric particles in a cured matrix. For example, the z-axis anisotropic dielectric layer 110 may comprise barium titanate in a polyimide matrix. Those of skill in the art will appreciate other materials exhibiting z-axis anisotropy suitable for the present invention. For example, certain ceramics exhibit dielectric anisotropy as would also be appreciated by those skilled in the art.

Figure 6:
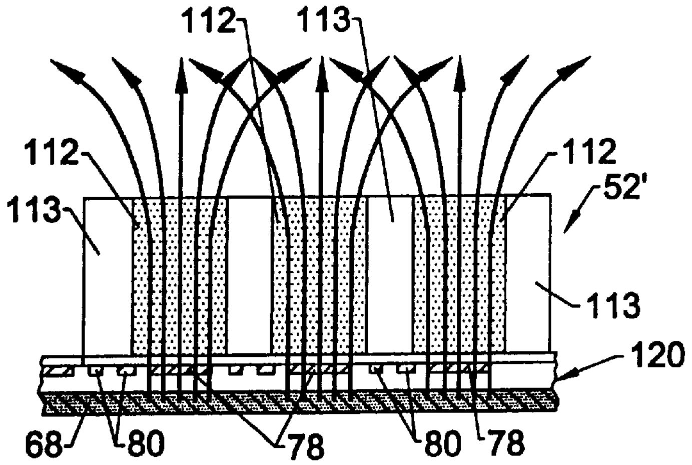
FIG. 6 is a greatly enlarged side cross-sectional view of a portion of an alternate embodiment of the fingerprint sensor in accordance with the invention.

Turning to FIG. 6, another variation of a z-axis dielectric covering 52' is schematically shown by a plurality of high dielectric portions 112 aligned with corresponding electric field sensing electrodes 78, and a surrounding matrix of lower dielectric portions 113. This embodiment of the dielectric covering 52' may be formed in a number of ways, such as by forming a layer of either the high dielectric or low dielectric portions, selectively etching same, and filling the openings with the opposite material. Another approach may be to use polarizable microcapsules and subjecting same to an electric field during curing of a matrix material. A material may be compressed to cause the z-axis anisotropy. Laser and other selective processing techniques may also be used as would be readily understood by those skilled in the art.

Figure 7:
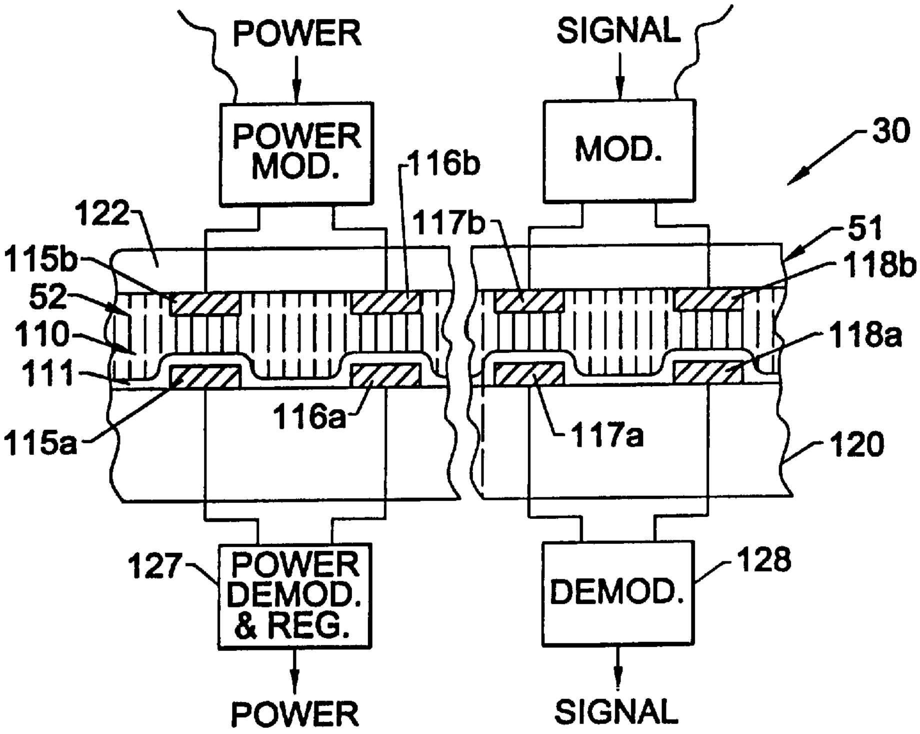
FIG. 7 is a greatly enlarged side cross-sectional view of another portion of the fingerprint sensor as shown in FIG. 1.

Another aspect of the invention relates to being able to completely cover and protect the entire upper surface of the integrated circuit die 120, and still permit connection and communication with the external devices and circuits as now further explained with reference to FIG. 7. The third metal layer 71 (FIG. 2) preferably further includes a plurality of capacitive coupling pads 116*a*–118*a* for permitting capacitive coupling of the integrated circuit die 120. Accordingly, the dielectric covering 52 is preferably continuous over the capacitive coupling pads 116*a*–118*a* and the array of electric field sensing electrodes 78 of the pixels 30*a* (FIG. 1). In sharp contrast to this feature of the present invention, it is conventional to create openings through an outer coating to electrically connect to the bond pads. Unfortunately, these openings would provide pathways for water and/or other contaminants to come in contact with and damage the die.

A portion of the package 51 includes a printed circuit board 122 which carries corresponding pads 115*b*–118*b*. A power modulation circuit 124 is coupled to pads 115*b*–116*b*, while a signal modulation circuit 126 is illustrative coupled to pads 117*b*–118*b*. As would be readily understood by those skilled in the art, both power and signals may be readily coupled between the printed circuit board 122 and the integrated circuit die 120, further using the illustrated power demodulation/regulator circuit 127, and the signal demodulation circuit 128. The z-axis anisotropic dielectric layer 110 also advantageously reduces cross-talk between adjacent capacitive coupling pads. This embodiment of the invention 30 presents no penetrations through the dielectric covering 52 for moisture to enter and damage the integrated circuit die 120. In addition, another level of insulation is provided between the integrated circuit and the external environment.

For the illustrated fingerprint sensor 30, the package 51 preferably has an opening aligned with the array of electric field sensing electrodes 78 (FIGS. 1–3). The capacitive coupling and z-axis anisotropic layer 110 may be advantageously used in a number of applications in addition to the illustrated fingerprint sensor 30, and particularly where it is desired to have a continuous film covering the upper surface of the integrated circuit die 120 and pads 116*a*–118*a*.

Further aspects of the manufacturing of the sensor 30 including the z-axis anisotropic dielectric material are explained in U.S. patent application, Ser. No. 08/857,525, filed May 16, 1997, entitled "Direct Chip Attachment Method and Devices Produced Thereby". This patent application has attorney work docket no. 18763, is assigned to the present assignee, and the entire disclosure of which is incorporated herein by reference.

Figure 8:
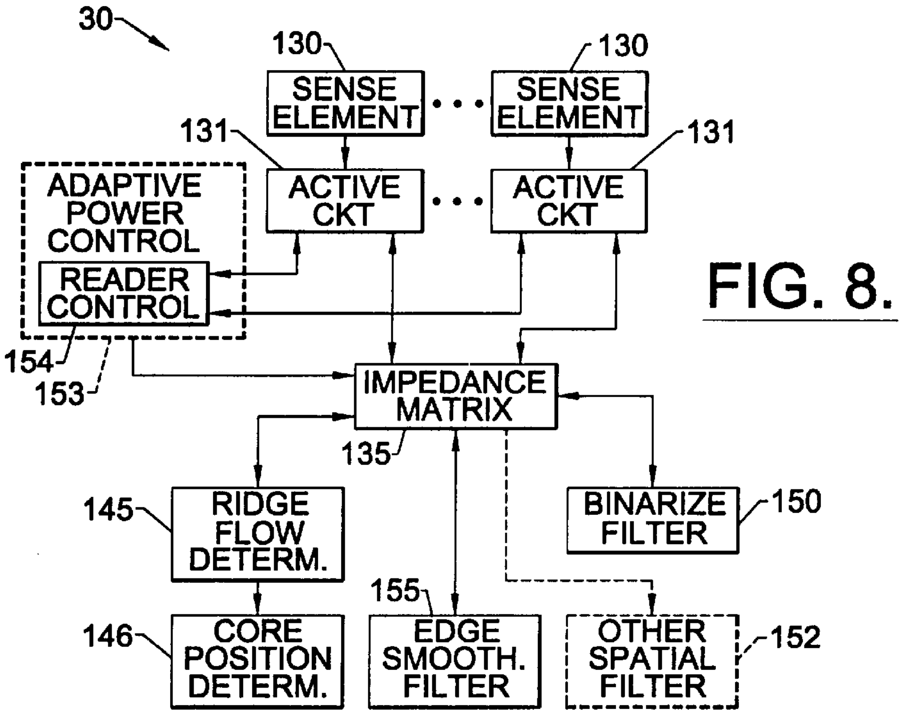
FIG. 8 is a schematic block diagram of yet another circuit portion of the fingerprint sensor as shown in FIG. 1.
Figure 9:
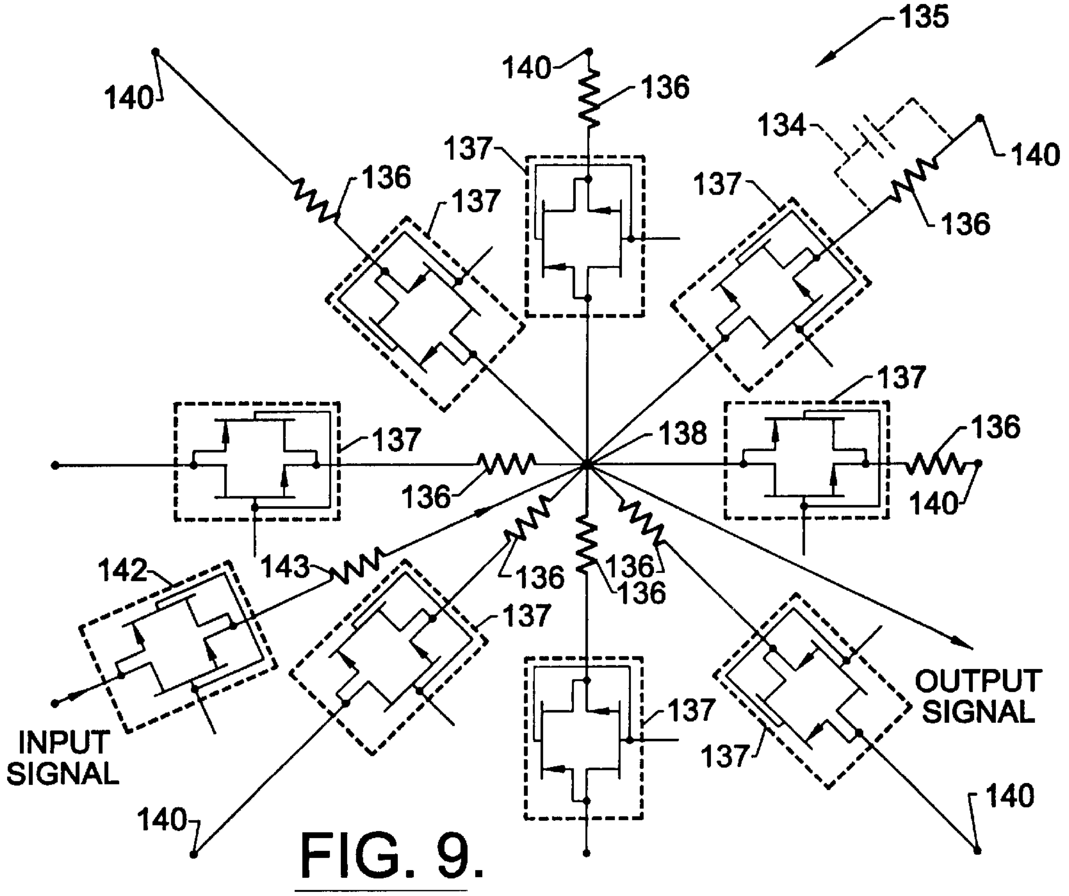
FIG. 9 is a schematic circuit diagram of a portion of the circuit as shown in FIG. 8.

Referring additionally to FIGS. 8 and 9, impedance matrix filtering aspects of the invention are now described. As shown in FIG. 8, the fingerprint sensor 30 may be considered as comprising an array of fingerprint sensing elements 130 and associated active circuits 131 for generating signals relating to the fingerprint image. The illustrated sensor 30 also includes an impedance matrix 135 connected to the active circuits for filtering the signals therefrom.

As shown with more particular reference to FIG. 9, the impedance matrix 135 includes a plurality of impedance elements 136 with a respective impedance element connectable between each active circuit of a respective fingerprint sensing element as indicated by the central node 138, and the other active circuits (outer nodes 140). The impedance matrix 135 also includes a plurality of switches 137 with a respective switch connected in series with each impedance element 136. An input signal may be supplied to the central node 138 via the illustrated switch 142 and its associated impedance element 143. The impedance element may one or more of a resistor as illustrated, and a capacitor 134 as would be readily appreciated by those skilled in the art.

Filter control means may operate the switches 137 to perform processing of the signals generated by the active circuits 131. In one embodiment, the fingerprint sensing elements 130 may be electric field sensing electrodes 78, and the active circuits 131 may be amplifiers 73 (FIG. 2). Of course other sensing elements and active circuits may also benefit from the impedance matrix filtering of the present invention as would be readily understood by those skilled in the art.

Ridge flow determining means 145 may be provided for selectively operating the switches 137 of the matrix 135 to determine ridge flow directions of the fingerprint image. More particularly, the ridge flow determining means 145 may selectively operate the switches 137 for determining signal strength vectors relating to ridge flow directions of the fingerprint image. As would be readily understood by those skilled in the art, the ridge flow directions may be determined based upon well known rotating slit principles.

The sensor 30 may include core location determining means 146 cooperating with the ridge flow determining means 145 for determining a core location of the fingerprint image. The position of the core is helpful, for example, in extracting and processing minutiae from the fingerprint image as would also be readily understood by those skilled in the art.

As also schematically illustrated in FIG. 8, a binarizing filter 150 may be provided for selectively operating the switches 137 to convert a gray scale fingerprint image to a binarized fingerprint image. Considered another way, the impedance matrix 135 may be used to provide dynamic image contrast enhancement. In addition, an edge smoothing filter 155 may be readily implemented to improve the image. As also schematically illustrated other spatial filters 152 may also be implemented using the impedance matrix 135 for selectively operating the switches 137 to spatially filter the fingerprint image as would be readily appreciated by those of skill in the art. Accordingly, processing of the fingerprint image may be carried out at the sensor 30 and thereby reduce additional downstream computational requirements.

As shown in the illustrated embodiment of FIG. 9, the impedance matrix 135 may comprise a plurality of impedance elements with a respective impedance element 136 connectable between each active circuit for a given fingerprint sensing element 130 and eight other active circuits for respective adjacent fingerprint sensing elements.

Yet another aspect of the invention is the provision of control means 153 for sequentially powering sets of active circuits 131 to thereby conserve power. Of course, the respective impedance elements 136 are desirably also sequentially connected to perform the filtering function. The powered active circuits 131 may be considered as defining a cloud or kernel as would be readily appreciated by those skilled in the art. The power control means 153 may be operated in an adaptive fashion whereby the size of the area used for filtering is dynamically changed for preferred image characteristics as would also be readily understood by those skilled in the art. In addition, the power control means 153 may also power only certain ones of the active circuits corresponding to a predetermined area of the array of sensing elements 130. For example, every other active circuit 131 could be powered to thereby provide a larger area, but reduced power consumption as would also be understood by those skilled in the art.

Reader control means 154 may be provided to read only predetermined subsets of each set of active circuits 131 so that a contribution from adjacent active circuits is used for filtering. In other words, only a subset of active circuits 131 are typically simultaneously read although adjacent active circuits 131 and associated impedance elements 136 are also powered and connected, respectively. For example, 16 impedance elements 136 could define a subset and be readily simultaneously read. The subset size could be optimized for different sized features to be determined as would be readily appreciated by those skilled in the art.

Accordingly, the array of sense elements 130 can be quickly read, and power consumption substantially reduced since all of the active circuits 131 need not be powered for reading a given set of active circuits. For a typical sensor, the combination of the power control and impedance matrix features described herein may permit power savings by a factor of about 10 as compared to powering the full array.

It is another important advantage of the fingerprint sensor 30 according to present invention to guard against spoofing or deception of the sensor into incorrectly treating a simulated image as a live fingerprint image. For example, optical sensors may be deceived or spoofed by using a paper with a fingerprint image thereon. The unique electric field sensing of the fingerprint sensor 30 of the present invention provides an effective approach to avoiding spoofing based upon the complex impedance of a finger.

Figure 10:
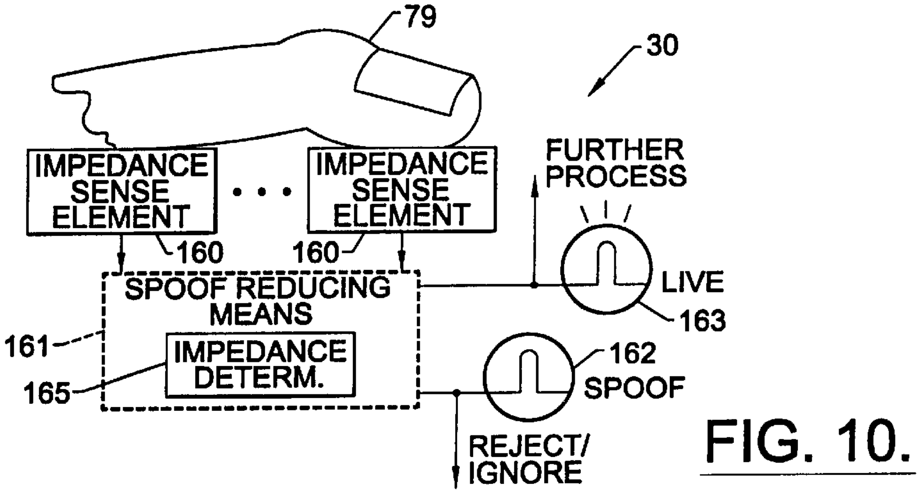
FIG. 10 is a schematic block diagram of still another circuit portion of the fingerprint sensor as shown in FIG. 1.

As shown in FIG. 10, the fingerprint sensor 30 may be considered as including an array of impedance sensing elements 160 for generating signals related to a finger 79 or other object positioned adjacent thereto. In the embodiment described herein, the impedance sensing elements 160 are provided by electric field sensing electrodes 78 and amplifiers 73 (FIG. 2) associated therewith. In addition, a guard shield 80 may be associated with each electric field sensing electrode 78 and connected to a respective amplifier 73. Spoof reducing means 161 is provided for determining whether or not an impedance of the object positioned adjacent the array of impedance sensing elements 160 corresponds to a live finger 79 to thereby reduce spoofing of the fingerprint sensor by an object other than a live finger. A spoofing may be indicated, such as by the schematically illustrated lamp 163 and/or used to block further processing. Alternately, a live fingerprint determination may also be indicated by a lamp 164 and/or used to permit further processing of the fingerprint image as will be readily appreciated by those skilled in the art. Many other options for indicating a live fingerprint or an attempted spoofing will be readily appreciated by those skilled in the art.

In one embodiment, the spoof reducing means 161 may include impedance determining means 165 to detect a complex impedance having a phase angle in a range of about 10 to 60 degrees corresponding to a live finger 79. Alternately, the spoof reducing means 161 may detect an impedance having a phase angle of about 0 degrees corresponding to some objects other than a live finger, such as a sheet of paper having an image thereon, for example. In addition, the spoof reducing means 161 may detect an impedance of 90 degrees corresponding to other objects.

Figure 11:
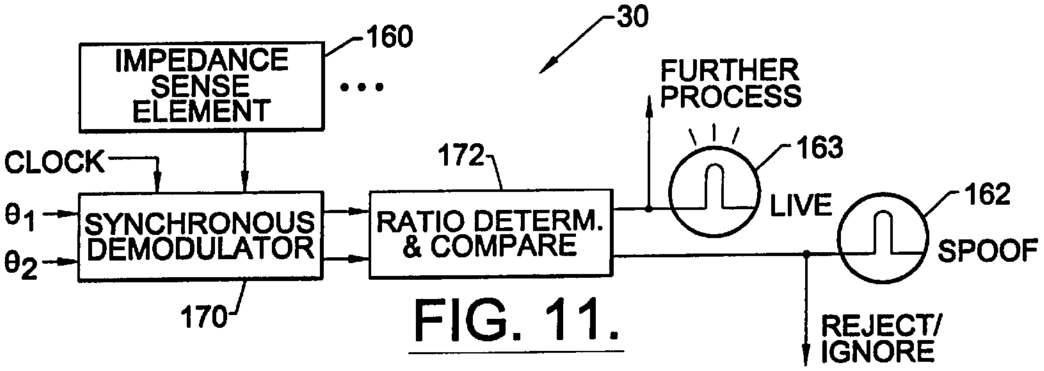
FIG. 11 is a schematic block diagram of an alternate embodiment of the circuit portion shown in FIG. 10.

Turning now to FIG. 11, another embodiment of spoof reducing means is explained. The fingerprint sensor 30 may preferably includes drive means for driving the array of impedance sensing elements 160, such as the illustrated excitation amplifier 74 (FIG. 2). The sensor also includes synchronous demodulator means 170 for synchronously demodulating signals from the array of impedance sensing elements 160. Accordingly, in one particularly advantageous embodiment of the invention, the spoof reducing means comprises means for operating the synchronous demodulator means 170 at at least one predetermined phase rotation angle. For example, the synchronous demodulator means 170 could be operated in a range of about 10 to 60 degrees, and the magnitude compared to a predetermined threshold indicative of a live fingerprint. A live fingerprint typically has a complex impedance within the range of 10 to 60 degrees.

Alternately, ratio generating and comparing means 172 may be provided for cooperating with the synchronous demodulator means 170 for synchronously demodulating signals at first and second phase angles $\theta_1$, $\theta_2$, generating an amplitude ratio thereof, and comparing the amplitude ratio to a predetermined threshold to determine whether the object is a live fingerprint or other object. Accordingly, the synchronous demodulator 170 may be readily used to generate the impedance information desired for reducing spoofing of the sensor 30 by an object other than a live finger. The first angle $\theta_1$ and the second $\theta_2$ may have a difference in a range of about 45 to 90 degrees, for example. Other angles are also contemplated by the invention as would be readily appreciated by those skilled in the art.

The fingerprint sensor 30 also includes an automatic gain control feature to account for a difference in intensity of the image signals generated by different fingers or under different conditions, and also to account for differences in sensor caused by process variations. It is important for accurately producing a fingerprint image, that the sensor can discriminate between the ridges and valleys of the fingerprint. Accordingly, the sensor 30 includes a gain control feature, a first embodiment of which is understood with reference to FIG. 12.

Figure 12:
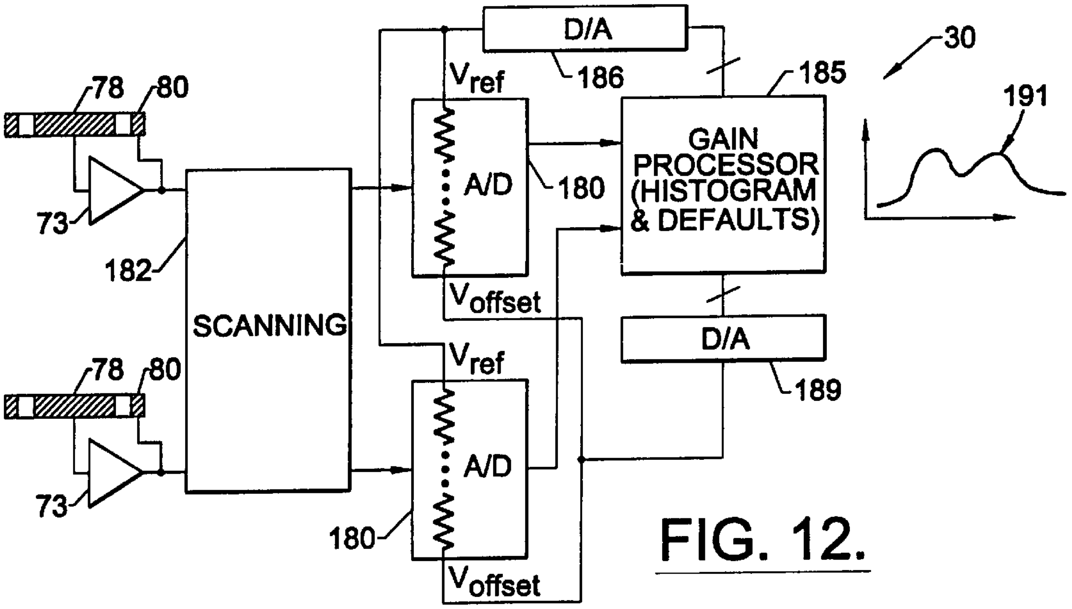
FIG. 12 is a schematic block diagram of an additional circuit portion of the fingerprint sensor as shown in FIG. 1.

As shown in FIG. 12, the illustrated portion of the fingerprint sensor 30 includes an array of fingerprint sensing elements in the form of the electric field sensing electrodes 78 and surrounding shield electrodes 80 connected to the amplifiers 73. Other fingerprint sensing elements may also benefit from the following automatic gain control implementations as will be appreciated by those skilled in the art.

The signal processing circuitry of the sensor 30 preferably includes a plurality of analog-to-digital (A/D) converters 180 as illustrated. Moreover, each of these A/D converters 180 may have a controllable scale. Scanning means 182 sequentially connects different elements to the bank of A/D converters 180. The illustrated gain processor 185 provides range determining and setting means for controlling the range of the A/D converters 180 based upon prior A/D conversions to thereby provide enhanced conversion resolution. The A/D converters 180 may comprise the illustrated reference voltage input $V_{ref}$ and offset voltage input $V_{offset}$ for permitting setting of the range as would be readily appreciated by those skilled in the at. Accordingly, the range determining and setting means may also comprise a first digital-to-analog D/A converter 186 connected between the gain processor 185 and the reference voltage $V_{ref}$ inputs of the A/D converters 180 as would also be readily understood by those skilled in the art. In addition, a second D/A converter 189 is also illustratively connected to the offset voltage inputs $V_{offset}$ from the gain processor 185.

The gain processor 185 may comprise histogram generating means for generating a histogram, as described above, and based upon prior A/D conversions. The graph adjacent the gain processor 185 in FIG. 12 illustrates a typical histogram plot 191. The histogram plot 191 includes two peaks corresponding to the sensed ridges and valleys of the fingerprint as would be readily appreciated by those skilled in the art. By setting the range for the A/D converters 180, the peaks can be readily positioned as desired to thereby account for the variations discussed above and use the full resolution of the A/D converters 180.

Figure 13:
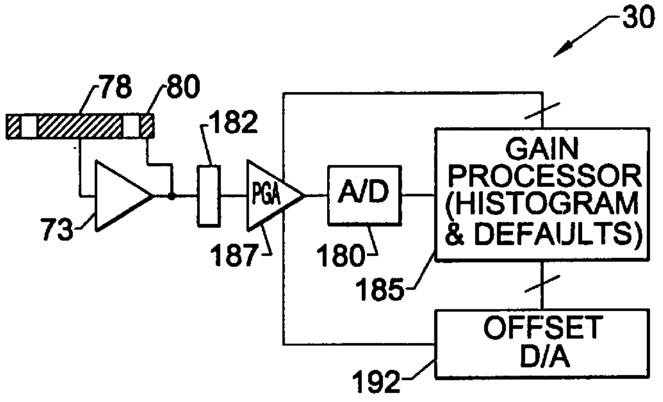
FIG. 13 is a schematic block diagram of an alternate embodiment of the circuit portion shown in FIG. 12.

Turning additionally to FIG. 13, the A/D converters 180 may include an associated input amplifier for permitting setting of the range. In this variation, the range determining and setting means may also comprise the illustrated gain processor 185, and wherein the amplifier is a programmable gain amplifier (PGA) 187 connected to the processor. A digital word output from the gain processor 185 sets the gain of the PGA 187 so that full use of the resolution of the A/D converters 180 is obtained for best accuracy. A second digital word output from the gain processor 185 and coupled to the amplifier 187 through the illustrated D/A converter 192 may also control the offset of the amplifier as would also be readily appreciated by those skilled in the art.

The range determining and setting means of the gain processor 185 may comprise default setting means for setting a default range for initial ones of the fingerprint sensing elements. The automatic gain control feature of the present invention allows the D/A converters 180 to operate over their full resolution range to thereby increase the accuracy of the image signal processing.

Figure 14:
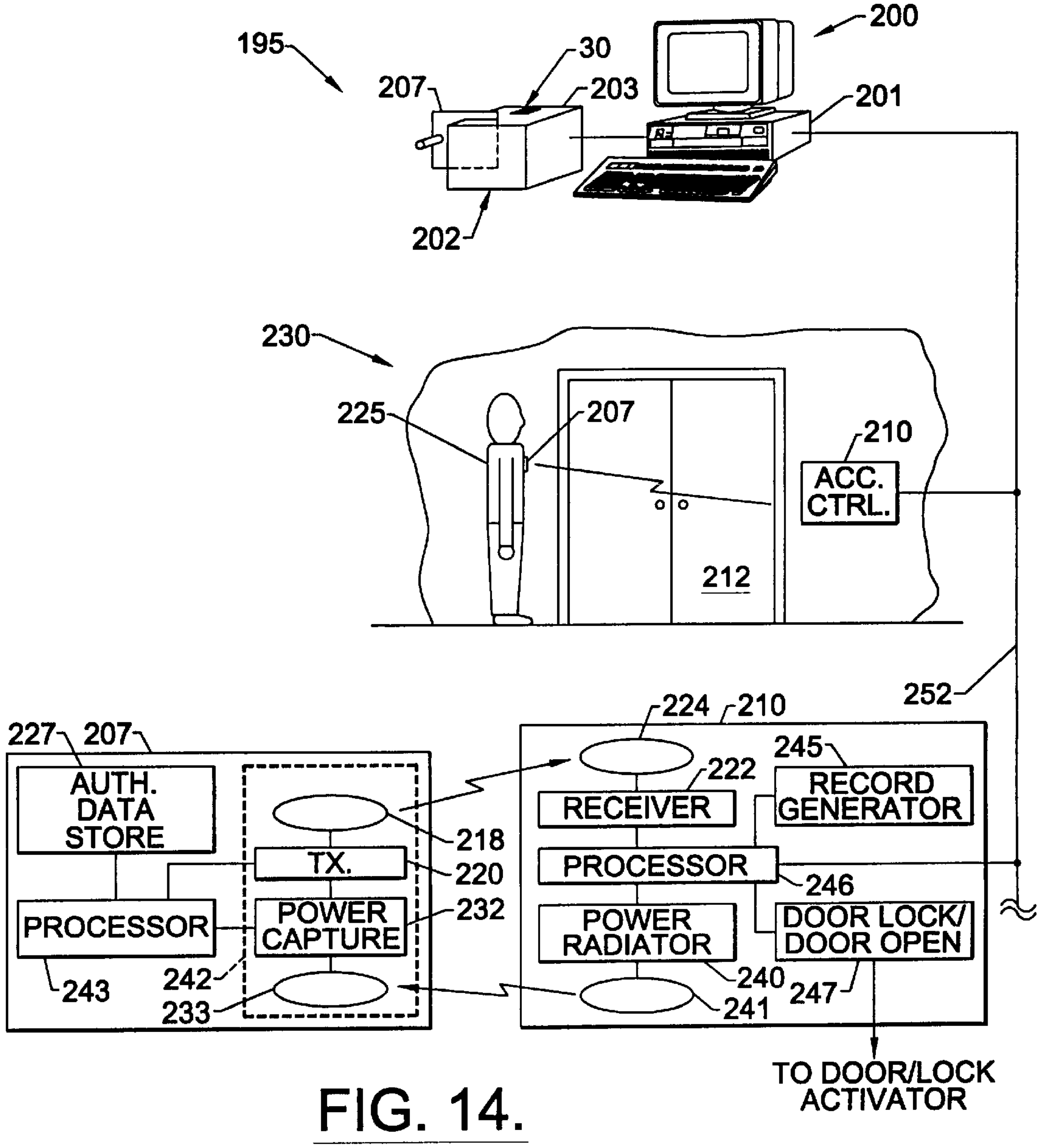
FIG. 14 is a schematic diagram of an application of the fingerprint sensor for access control in accordance with the present invention.

Turning now to FIG. 14 an advantageous application of the fingerprint sensor 30 to an access control system 195 is now described. The access control system 195 includes the illustrated fingerprint enrolling station 200 for sensing a fingerprint of a person and enrolling the person as an authorized person based upon the sensed fingerprint. As will be readily appreciated by those skilled in the art, a fingerprint is a highly accurate indicator of a person's identity. Moreover, as described extensively herein, the integrated circuit fingerprint sensor 30 includes a number of desirable features including reliability, low cost, low power consumption, and spoof reducing features.

The enrolling station 200 includes the illustrated personal computer 201 and a badge programming device 202. The badge programming device 202 includes the fingerprint sensor 30 mounted on an upper surface of the device housing 203. The device 202 also includes a slot for accepting a planar access triggering device, such as the illustrated access badge 207. The badge programming device 202 loads data onto a memory storage portion of the badge 207 as described in greater detail below and as would be readily understood by those skilled in the art.

An access controller 210 is provided at the access location 230 for granting access to an authorized person 225 bearing the access triggering device or access badge 207. The access triggering device may be in many other card-like forms, such as a card adapted to be carried in a pocket or wallet, for example. Those of skill in the art will recognize other similar configurations of an access triggering device that are also relatively compact and easy to carry.

In the central portion of FIG. 14, the access location 230 is at a door 212. As mention briefly above, the access badge 207 preferably includes data storing means 227, cooperating with the enrolling station 200, for storing authorization data for an authorized person. The data storing means 227 stores data for a person who has been enrolled into the system 195 as an authorized person. The data storing means 227 may be provided by any of a number of conventional memory or data storage devices as will be readily appreciated by those skilled in the art.

As shown in the lower schematic block diagram portion of FIG. 14, the access badge 207 also preferably includes a wireless transmitter 220 for transmitting an authorization signal related to the stored authorization data. The stored authorization signal data may be an authorizing code, or may be data based on the sensed fingerprint, for example. In addition, the access controller 210 preferably includes a wireless receiver 222 and its associated antenna 224 for receiving the authorization signal. The wireless receiver 222 cooperates with the illustrated processor 223 for granting access responsive to the access card 207, including the wireless transmitter 220 and its associated antenna 218, being in proximity to the wireless receiver 222.

The authorized person 225 bearing the access card 207 may unobtrusively be granted access merely by approaching the access location. The access triggering device or badge 207 will communicate with the access controller 210 and grant access as long as the device bearer is sufficiently close to the access location 230. In other words, the authorized person 225 need not go through the inconvenience of manipulating a card in contact with a card reader, for example. In addition, the person 225 need not be subject to another fingerprinting step at the access location 230. Moreover, a high degree of security is provided since the person 225 is originally enrolled based upon the positive identification afforded by fingerprint sensing.

In one particularly, advantageous embodiment, the access badge 207 includes a passive transponder 242. By passive transponder 242 is meant that the badge 207 has no onboard battery, but rather that the transmitter 220, and other associated electronics are temporarily powered by the illustrated power capture means 232 and its associated antenna 233. Thus, the access controller 210 preferably comprises transponder powering or radiating means 240 and its associated antenna 241 for powering the passive transponder 242 when positioned in proximity thereto.

The operation of a passive transponder 242 and power radiating means 240 will be readily appreciated by those skilled in the art without further discussion. Moreover, the transponder 242 and power radiator 240, for example, may be configured so that powering and transmission occurs only as the authorized person 225 is within a predetermined distance of the access controller 210 at the access location 230. As would also be readily understood by those skilled in the art, the data storing means 227, processor 243, and passive transponder 242 may be readily miniaturized to fit on or within a card or other substrate so as to be readily carried in a pocket or wallet, for example, in addition to the illustrated badge 207.

Another aspect of the invention is the provision of record generating means 245 for causing generation of a record of granting access to the authorized person. For example, the record may be generated at the access controller 210 and later downloaded to a central computer, such as the illustrated personal computer 201 of the enrolling station 200. In another variation, the record generating means 245 may communicate with the personal computer 201 to cause the computer to generate and maintain the record.

As shown in the illustrated embodiment, the access controller 210 may be connected to the illustrated enrolling station 200, so that the enrolling station serves a central control computer. The central control computer may have many uses including the control of access levels for different classes of authorized persons, and for controlling access based on time of day, for example. Other main or central control configurations are also contemplated by the invention and will be readily appreciated by those skilled in the art. In addition to the schematically illustrated wireline connection 252 between the personal computer 201 and the access controllers 210, these communication links may also be wireless, using equipment typically used for wireless local area networks, as would be readily understood by those skilled in the art.

The data storing means 227 of the access badge 207 may also include identity storing means for storing authorization data relating to the identity of the authorized person. Accordingly, a record of the person's identity may be made along with the record of granting access as will be readily appreciated by those skilled in the art.

The access control system 195 may include an access door 212. The access controller 210 also illustratively includes door control means 247 for controlling opening or locking of the access door. The door control means 247 will typically interface with an actuator, such as for opening the door 212, or a powered door strike for unlocking the door as will also be readily appreciated by those skilled in the art.

A method aspect of the present invention is for access control at an access location 230. The method preferably comprises the steps of: sensing a fingerprint of a person and enrolling the person as an authorized person 225 based upon the sensed fingerprint; storing authorization data for an authorized person in an access triggering device 207 to be carried by the authorized person; transmitting an authorization signal related to the stored authorization data; and receiving the authorization signal and granting access to an authorized person bearing the access triggering device based upon the access triggering device being in proximity to the access location 230. As mentioned above, the access triggering device may comprise a passive transponder 218. Accordingly, the method may preferably further comprise the step of powering the passive transponder 242 when positioned in proximity to the access location.

Other aspects, advantages, and features relating to sensing of fingerprints are disclosed in copending U.S. patent application Ser. No. 08/592,469 entitled "Electric Field Fingerprint Sensor and Related Methods", and U.S. patent application Ser. No. 08/671,430 entitled "Integrated Circuit Device Having an Opening Exposing the Integrated Circuit Die and Related Methods", both assigned to the assignee of the present invention, and the entire disclosures of which are incorporated herein by reference. In addition, many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. An access control system comprising:

fingerprint enrolling means for sensing a fingerprint of a person and enrolling the person as an authorized person based upon the sensed fingerprint;

access control means for granting access to the authorized person; and a passive access triggering device to be carried by the authorized person, said passive access triggering device comprising data storing means, cooperating with said fingerprint enrolling means, for storing authorization data for the authorized person, and wireless transmitter means comprising a passive transponder for transmitting an authorization signal related to the stored authorization data responsive to said passive access triggering device being positioned in proximity to said access control means;

said access control means comprising passive transponder powering means for powering said passive transponder when positioned in proximity thereto, and wireless receiver means for receiving the authorization signal from said passive access triggering device.

2. An access control system according to claim 1 wherein said access control means further comprises record generating means for causing generation of a record of granting access to the authorized person.

3. An access control system according to claim 2 wherein said data storing means comprises identity storing means for storing authorization data relating to the identity of the authorized person.

4. An access control system according to claim 3 wherein said record generating means comprises means for causing generation of the record further including data relating to the identity of the authorized person granted access.

5. An access control system according to claim 1 wherein said passive access triggering device comprises a card to be carried by the authorized person.

6. An access control system according to claim 1 further comprising an access door; and wherein said access control means further comprises door control means for controlling opening of said access door.

7. An access control system according to claim 6 wherein said access door control means further comprises unlocking means for unlocking said access door.

8. An access control system according to claim 6 wherein said access door control means further comprises door opening means for opening the access door.

9. An access control system according to claim 1 wherein said fingerprint sensor is an integrated circuit fingerprint sensor.

10. An access control system according to claim 9 wherein said integrated circuit fingerprint sensor comprises:

a substrate; and at least one electrically conductive layer positioned adjacent said substrate and comprising portions defining an array of electric field sensing electrodes.

11. An access control system according to claim 10 wherein said at least one electrically conductive layer further comprises portions defining a respective shield electrode for each electric field sensing electrode.

12. An access control system comprising:

fingerprint enrolling means for sensing a fingerprint of a person and enrolling the person as an authorized person based upon the sensed fingerprint;

access control means for granting access to the authorized person; and a passive access triggering device to be carried by the authorized person, said passive access triggering device comprising data storing means, cooperating with said enrolling means, for storing authorization data for the authorized person, and wireless passive transponder means for transmitting an authorization signal related to the stored authorization data responsive to said passive access triggering device being positioned in proximity to said access control means;

said access control means for granting access to the authorized person bearing said passive access triggering device and without requiring sensing of a fingerprint of the authorized person bearing said passive access triggering device, said access control means comprising wireless passive transponder powering means for powering said wireless passive transponder means when positioned in proximity thereto, and wireless receiver means for receiving the authorization signal from said passive access triggering device.

13. An access control system according to claim 12 wherein said access control means further comprises record generating means for causing generation of a record of granting access to the authorized person.

14. An access control system according to claim 13 wherein said data storing means comprises identity storing means for storing authorization data relating to the identity of the authorized person.

15. An access control system according to claim 14 wherein said record generating means comprises means for causing generation of the record further including data relating to the identity of the authorized person granted access.

16. An access control system according to claim 12 wherein said passive access triggering device comprises a card to be carried by the authorized person.

17. An access control system according to claim 12 further comprising an access door; and wherein said access control means further comprises door control means for controlling opening of said access door.

18. An access control system according to claim 12 wherein said fingerprint sensor is an integrated circuit fingerprint sensor.

19. An access control system according to claim 18 wherein said integrated circuit fingerprint sensor comprises:

a substrate; and at least one electrically conductive layer positioned adjacent said substrate and comprising portions defining an array of electric field sensing electrodes.

20. An access control system according to claim 19 wherein said at least one electrically conductive layer further comprises portions defining a respective shield electrode for each electric field sensing electrode.

21. A method for access control at an access location, comprising the steps of:

sensing a fingerprint of a person and enrolling the person as an authorized person based upon the sensed fingerprint;

storing authorization data for the authorized person in a passive access triggering device to be carried by the authorized person, the passive access triggering device comprises a passive transponder;

powering the passive transponder when positioned in proximity to the access location;

transmitting from the passive transponder an authorization signal related to the stored authorization data responsive to the passive transponder being positioned in proximity to the access location; and receiving the authorization signal and granting access to the authorized person bearing the passive access triggering device based upon receiving the authorization signal from the passive access triggering device.

22. A method according to claim 21 further comprising the step of causing generation of a record of granting access to the authorized person.

23. A method according to claim 21 further comprising the step of causing generation of a record of granting access to the authorized person and including an identity thereof.

24. A method according to claim 21 wherein the step of sensing a fingerprint comprising sensing a fingerprint using an integrated circuit fingerprint sensor.

* * * * *